United States Patent [19]

Tanaka

[11] Patent Number: 4,907,183
[45] Date of Patent: Mar. 6, 1990

[54] BATTERY POWERED COMPUTER SYSTEM WHEREIN A POWER SUPPLY IS SELECTIVELY SHUT OFF WHEN A LOW BATTERY POWER IS DETECTED

[75] Inventor: Nobuyuki Tanaka, Ome, Japan

[73] Assignee: Kabushiki Kaisha Toshiba, Kanagawa, Japan

[21] Appl. No.: 172,406

[22] Filed: Mar. 24, 1988

[30] Foreign Application Priority Data

Mar. 25, 1987 [JP] Japan ................................ 62-68995

[51] Int. Cl.⁴ .................................................. G06F 1/00
[52] U.S. Cl. .................................... 364/707; 364/900; 364/948.7; 365/229
[58] Field of Search ............... 364/707, 200 MS File, 364/900 MS File; 365/229

[56] References Cited

U.S. PATENT DOCUMENTS

| 3,755,806 | 8/1973 | Bunting | 364/707 |
| 4,461,003 | 7/1984 | Tamaki | 364/900 |
| 4,667,289 | 5/1987 | Yoshida et al. | 364/707 |
| 4,674,031 | 6/1987 | Siska, Jr. | 364/900 |
| 4,747,041 | 5/1988 | Engel et al. | 364/707 |

Primary Examiner—David L. Clark
Assistant Examiner—Dale M. Shaw
Attorney, Agent, or Firm—Finnegan, Henderson, Farabow, Garrett and Dunner

[57] ABSTRACT

A method and related apparatus for extending the battery life in a battery powered computer system having a high power consumption peripheral device, such as a hard disk. The energy state of the power supply battery is determined by a voltage detector. When the battery voltage drops to a level below which continued operation of the computer system will become unreliable or impossible, battery life is extended by de-energizing any high power consumption peripheral devices such as the hard disk, thereby providing an operator with additional time to store data or secure a backup power source. To prevent loss of data as it is being stored on a hard disk, one embodiment of the invention cuts off power to the hard disk only when the hard disk is operating in a standby mode, thereby improving data storage reliability.

7 Claims, 3 Drawing Sheets

BATTERY POWERED COMPUTER SYSTEM WHEREIN A POWER SUPPLY IS SELECTIVELY SHUT OFF WHEN A LOW BATTERY POWER IS DETECTED

BACKGROUND OF THE INVENTION

I. Field of the Invention

This invention relates to a portable microcomputer system and in particular to a battery operated microcomputer system having a hard disk.

II. Description of the Related Art

The development of low power consumption CMOS LSIs has led to the development of powerful battery operated microcomputer systems. In the past, nonvolatile data storage for such computers has been provided by microcassette data storage devices. As data storage technology has advanced, some battery operated computer systems have incorporated floppy disk devices (FDD) and hard disk devices (HDD). These peripheral data storage devices consist of a rotating magnetic storage medium driven by an electric motor. Since floppy disks spin at a low speed, the disk is rotated only when necessary to read or write data; however, the high rotating speeds of hard disks and the low required access times require that the HDD be kept rotating continuously. This results in high power consumption and low battery life in a battery powered computer system, and the battery life is determined mostly by the power consumption of the HDD.

In conventional battery powered computer systems, the charge, or energy, state of the battery is monitored during computer system operation. When the battery energy state has dropped to a predetermined level, normally measured by battery voltage, a visual or audible alarm is triggered giving the operator an opportunity to either store data currently in RAM and shut down the system or plug in an external power adapter to support continued computer system operation.

Battery powered computer systems employing HDDs experience a sharp drop in battery charge in a relatively short time, which is particularly acute in systems employing Ni-Cd battery power sources. Ni-Cd batteries maintain a fairly constant voltage during a discharge cycle until a low energy state is reached, then the voltage drops rapidly leaving only a very short time for the operator to take action to prevent a data loss, especially when a high power consumption peripheral device such as an HDD is in use. If the operator does not act quickly enough, valuable data will be lost as the battery rapidly expends its energy by continuing to operate the HDD.

It is an object of the present invention to minimize the risk of data loss in a battery powered computer system having a high power consumption peripheral device such as an HDD when the battery system reaches the end of a discharge cycle.

It is a further object of the present invention to shut down a high power consumption peripheral device such a HDD in a battery powered computer system only when the HDD is in a standby mode and not actively reading or writing data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purposes of the invention as embodied and broadly described herein, a battery powered computer system is provided comprising: a computer unit having a first power consumption; a peripheral device having a second, higher power consumption; a power supply having a battery power source, for supplying power corresponding to the energy state of the battery to the computer unit and the peripheral device; and control means responsive to the energy state of the battery for shutting off power from the power supply to the peripheral device at times when the energy state of the battery drops below a predetermined level.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
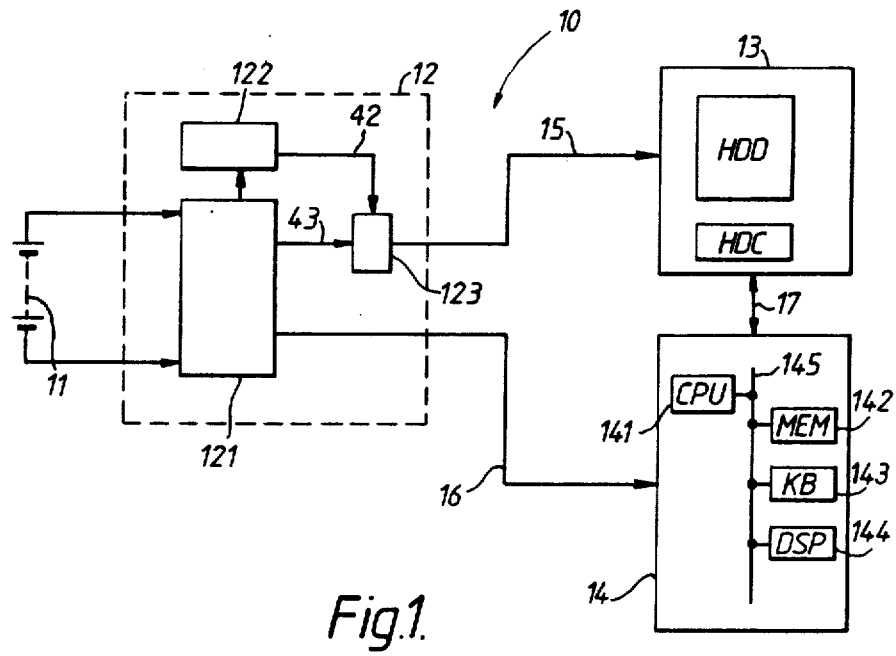
FIG. 1 is a block diagram of a first embodiment of a battery powered computer system employing the teachings of the present invention.

A first preferred embodiment of a battery powered computer system incorporating the teachings of the present invention is shown in FIG. 1 and comprises a power supply unit 12 having a battery 11, a detection circuit 122, a control circuit 123 and a DC-DC convertor 121; a high power consumption peripheral device 13, such as an HDD; and a lower power consumption processor and logic unit 14, also called a computer unit, having a CPU 141, memory 142, keyboard 143, and display 144.

Battery 11 is connected to DC-DC converter 121. DC-DC converter 121 provides a battery voltage signal to detection circuit 122, DC power to control circuit 123 via power supply line 43, and DC power to computer unit 14 via power supply line 16. Control circuit 123 provides DC power to peripheral device 13 via power supply line 15. The internal components of computer unit 14 are interconnected by system bus 145 which also connects to I/O bus 17 for transferring data to and from peripheral device 13.

During use of computer system 10, the energy state of battery 11 is monitored by detection circuit 122. In both preferred embodiments of the invention, the voltage of battery 11 is used as an indicator of the energy remaining in battery 11. When battery 11 reaches a low energy state, the condition is detected by detection circuit 122. A low energy state is the energy level below which battery voltage gradually drops to a point where operation of the computer system will be unreliable or impossible and therefore the operator must be warned to take action to save data. When a low energy state is detected by detection circuit 122, power supplied to the HDD and hard disk controller (HDC) of peripheral device 13 through power supply line 15 is interrupted by control circuit 123. Power continues to be supplied to computer unit 14 through power supply line 16.

Figure 3:
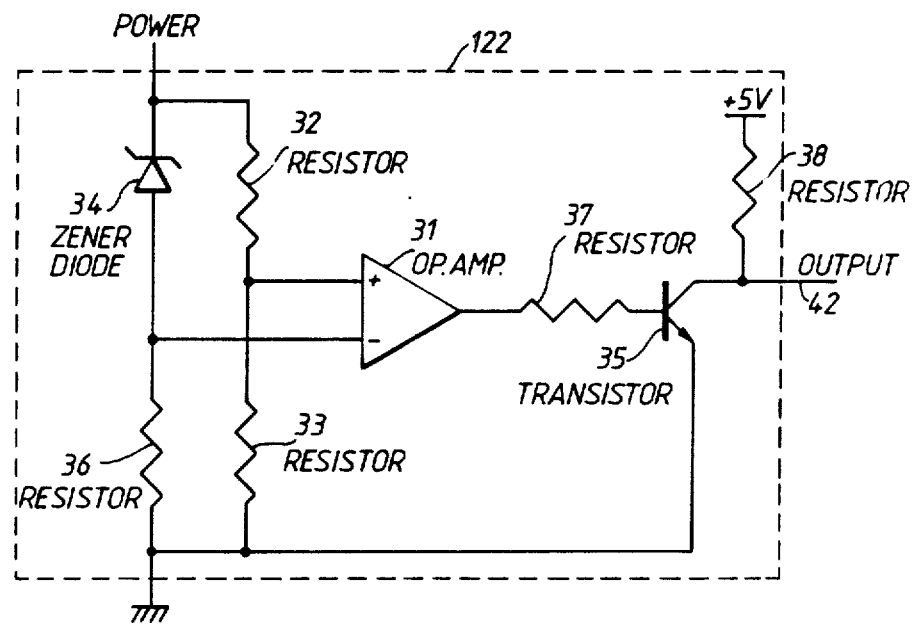
FIG. 3 is a circuit diagram showing details of the detector circuit of the battery powered computer system of FIGS. 1 and 2.

Detection circuit 122 is shown in detail in FIG. 3 and comprises operational amplifier (op. amp.) 31, resistors 32, 33, 36, 37, and 38, and transistor 35. The output of op. amp. 31 is determined by the relationship between voltages at op. amp. 31 input terminals A and B. If voltage A is greater than or equal to voltage B, an L-level output is generated by op. amp. 31. If voltage A is less than voltage B, an H-level output signal is generated at the output of op. amp. 31. The predetermined voltage at which op. amp. 31 output changes from L-level to H-level is determined by the ratio of the resistance of resistors 31 and 32 and the rated value of Zener diode 34. Transistor 35 is switched on and off by the output of op. amp. 31 and provides a low battery energy state signal on line 42. Resistors 36 and 37 are current limiting resistors to protect the components of detection circuit 122, and resistor 38 is a pull-up resistor that keeps the output signal on line 42 at an H-level when transistor 35 is turned off. Resistor 38 is connected to a +5 volt source from DC-DC convertor 121.

While the energy level of battery 11 is sufficient to maintain reliable operation of computer unit 14 and HDD 13, the relationship between output and input terminals A and B is such that voltage A is greater than or equal to voltage B. Under these circumstances, op. amp. 31 generates an L-level output. This turns off transistor 35 resulting in an H-level signal on line 42. During computer system operation, the energy state of battery 11 drops gradually, resulting in a lower battery voltage. Eventually op. amp. 31 input voltage A is less than op. amp. 31 input voltage B, resulting in an H-level output from op. amp. 31, turning on transistor 35 and lowering the output signal on line 42 to an L-level, signaling a low battery energy state.

Figure 4:
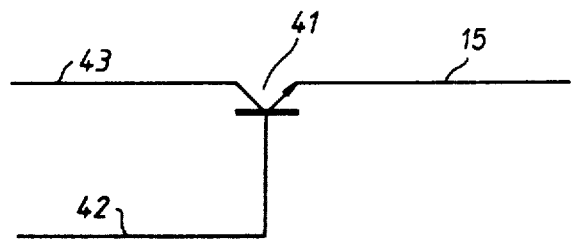
FIG. 4 is a circuit diagram of the control circuit of the battery powered computer system of FIG. 1.
Figure 5:
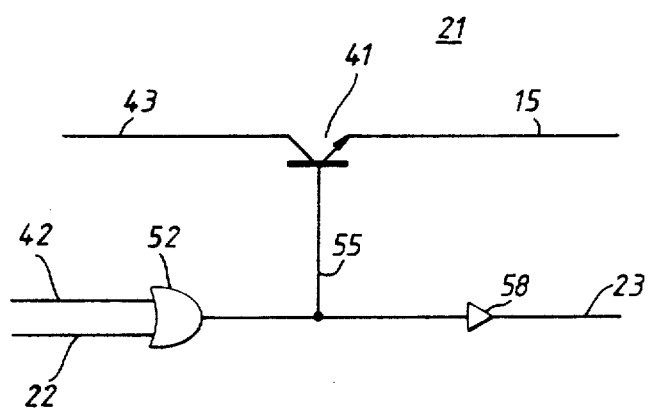
FIG. 5 is a circuit diagram of the control circuit of the battery powered computer system of FIG. 2.

Output 42 of detection circuit 122 provides a control input to transistor 41 of control circuit 123 shown in FIG. 4. The collector of transistor 41 is connected to DC-DC convertor power supply line 43, and the emitter of transistor 41 is connected to the HDD (peripheral device 13) by power supply line 15. If the energy state of battery 11 is sufficient to provide enough voltage to maintain reliable operation of computer system 10, detection circuit 122 provides an H-level output signal on line 42, holding transistor 41 in an on state and providing power to peripheral device 13. When battery 11 reaches a low energy state as indicated by a low battery voltage condition, detection circuit 122 provides an L-level signal on line 42 shutting off transistor 41 and de-energizing peripheral device 13. Operation of the lower power consumption computer unit 14 will continue with power supplied from DC-DC convertor 121 on power supply line 16. With the current drain on battery 11 substantially reduced by shutting off HDD 13, computer unit 14 may continue to operate for a longer period of time before battery voltage drops to a level at which continued operation is unreliable or impossible, giving an operator an increased amount of time to store data or initiate an alternate power source before the entire computer system shuts down as a result of low battery power.

In the first preferred embodiment of the invention, described above, peripheral device 13, preferably a hard disk, is completely de-energized when the battery energy state as measured by battery voltage reaches a predetermined value. Typically, an HDD operates in a read mode, a write mode, or a standby mode. It is undesirable to shut down a HDD when it is reading and especially when it is writing because data loss could occur. In the read and write modes, the disk is kept spinning by a drive motor, the magnetic pickup heads are energized to read and write data, and the magnetic pickup head positioning mechanism is energized. In the standby mode, the disk is kept spinning by the drive motor, but the read and write mechanisms are de-energized. The read and write modes of HDD operation are called the active mode.

Figure 2:
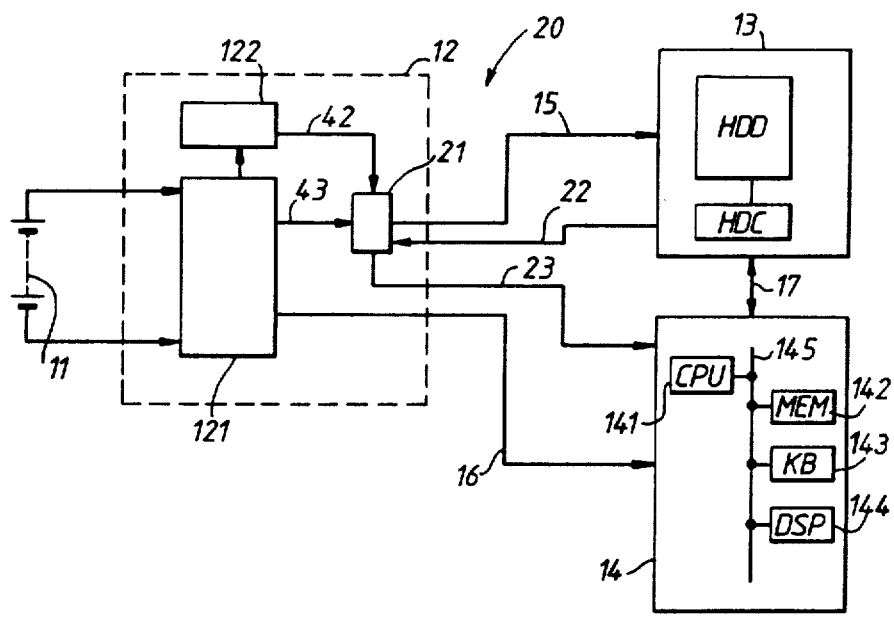
FIG. 2 is a block diagram of a battery powered computer system employing the teachings of a second preferred embodiment of the present invention.

A computer system 20 incorporating a second preferred embodiment of the present invention is shown in FIG. 2 where components identical to computer system 10 of the first preferred embodiment are identified by the same numerals. In accordance with the invention, a control circuit 21, shown by way of example and not as a limitation, shuts off power to high power consumption peripheral device 13, preferably a HDD as in the first preferred embodiment, only when HDD 13 is operating in a standby mode.

Control circuit 21 comprises power supply transistor 41', OR gate 52 and interface driver 58. In operation, the HDD of peripheral device 13 provides an HDD busy signal to control circuit 21 over HDD state signal line 22 when the HDD is operating in the active mode. When battery 11 voltage is at a satisfactory level to maintain reliable operation of computer system 20, detection circuit 122 provides an H-level signal to OR gate 52, turning on transistor 41' and providing DC power from DC-DC convertor 121 on power supply line 43 to power supply line 15 and HDD 13. In the absence of an HDD busy signal on line 22, when the energy state of battery 11, as indicated by voltage, drops to a predetermined level below which continued operation of computer system 20 may become unreliable, detection circuit 122 provides an L-level signal on line 42 shutting off transistor 41' and terminating DC power to peripheral device 13. If HDD 13 is operating in an active mode as indicated by an HDD busy signal on line 22, regardless of the signal from detection circuit 122, transistor 41' will remain switched on, providing power to HDD 13.

In addition to switching the state of transistor 41', the output of OR gate 52 provides an input to driver 58 which in turn provides a power supply state signal on line 23 to computer unit 14. Computer unit 14 may then provide an alarm to the computer operator indicating that the HDD has been shut down.

In the second preferred embodiment, when battery 11 reaches a low energy state HDD peripheral device 13 will be shut down by control circuit 21 if an HDD busy signal is not present (i.e., the HDD is operating in a standby mode), otherwise the high power consumption peripheral device will continue operating in an active mode until it switches to a standby mode, whereupon control circuit 21 will shut down HDD 13 and signal the power supply state to computer unit 14. Continuing to supply DC power to HDD 13 while the HDD is in an active mode provides increased data integrity at a small cost in additional battery drain.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

What is claimed is:

1. A battery powered computer system comprising:
   a computer unit having a first power consumption;
   a peripheral device having a second, higher power consumption, and operating in an active mode and a standby mode;
   a power supply having a battery power source, for supplying power corresponding to the energy state of the battery to said computer unit and said peripheral device; and
   control means responsive to the energy state of said battery for shutting off power to said peripheral device at times when said peripheral device operates in the standby mode and the energy state of said battery drops below a predetermined level.

2. The computer system of claim 1 wherein said control means includes means for signalling said computer unit when power has been cut off to said peripheral device.

3. A battery powered computer system comprising:
   a computer unit having a first power consumption;
   a peripheral device having a second, higher power consumption, and operating in an active mode and a standby mode;
   a power supply having a battery power source, for supplying power to said computer unit and said peripheral device;
   a detector for detecting the energy state of said battery; and
   control means responsive to said detector for shutting off power to said peripheral device at times when said peripheral device operates in the standby mode and the energy level of said battery drops below a predetermined level.

4. The computer system of claim 3 wherein said control means includes a transistor having a base connected to said detector, a collector connected to said power supply and an emitter connected to said peripheral device.

5. The computer system of claim 3 wherein said peripheral device is a hard disk data storage device.

6. A method of powering a computer system having a computer unit with a first, lower power consumption, and peripheral device with a second, higher power consumption, said peripheral device operating in an active mode and a standby mode, comprising the steps of:
   supplying power to the computer unit and the peripheral device from a power supply having a battery power source;
   detecting the energy state of said battery; and
   shutting off power to the peripheral device at times when said peripheral device operates in the standby mode and the energy level of said battery drops below a predetermined level.

7. The method of claim 6 wherein said step of shutting off power includes signalling said computer unit when power to said peripheral device has been shut off.

* * * * *